United States Patent [19]

Wilson

[11] 4,101,744
[45] Jul. 18, 1978

[54] CIRCUIT BREAKER RACKING MECHANISM FOR DRAWOUT TYPE SWITCHGEAR

[75] Inventor: George A. Wilson, Pineville, Pa.

[73] Assignee: Gould Inc., Rolling Meadows, Ill.

[21] Appl. No.: 734,955

[22] Filed: Oct. 22, 1976

[51] Int. Cl.² .................................... H01H 9/20
[52] U.S. Cl. ................................... 200/50 AA
[58] Field of Search ............... 200/50 AA, 153 SC; 361/335–339, 343

[56] References Cited

U.S. PATENT DOCUMENTS

| | | | |
|---|---|---|---|
| 2,777,024 | 1/1957 | West | 200/50 AA |
| 2,900,464 | 8/1959 | Frink et al. | 200/50 AA |
| 3,588,398 | 6/1971 | Siviy | 200/50 AA |
| 3,600,540 | 8/1971 | Bould | 200/50 AA X |
| 3,681,545 | 8/1972 | Cellerini et al. | 200/50 AA |
| 3,783,209 | 1/1974 | Cleaveland et al. | 200/50 AA |
| 4,002,865 | 1/1977 | Kuhn et al. | 200/50 AA |

*Primary Examiner*—James R. Scott
*Attorney, Agent, or Firm*—Ostrolenk, Faber, Gerb & Soffen

[57] ABSTRACT

A four position racking mechanism for a circuit breaker in a cubicle or housing providing Connected, Test, Disconnect and Out positions. The racking lead screw is mounted in the circuit breaker structure in its own support. The rear end of the racking screw is threaded to engage and move a travelling nut which rides in guide slots. The outer ends of the travelling nut engage a pair of connecting links which rotate a pivoted roller bracket. The roller bracket carries a racking roller which engages a cam slot in a member extending from the rear portion of the cubicle or housing. The shape of the cam slot plus the increasing lever arm of the connecting links around the pivot pin on the nut provide a variable racking force which is needed for primary disconnect contact engagement. The central positioning of the racking mechanism makes it suitable for any width of circuit breaker. The racking mechanism is interlocked with the closing mechanism; releasable locking means and interlock means are provided to limit the operation of the racking mechanism to conditions which are safe for the operator; thus, the unlocking of the racking mechanism after the breaker is tripped will hold the trip mechanism and hold it trip free as long as the racking mechanism is unlocked. An indexing element for the slide for the locking mechanism is provided for all the positions of the circuit breaker.

8 Claims, 23 Drawing Figures

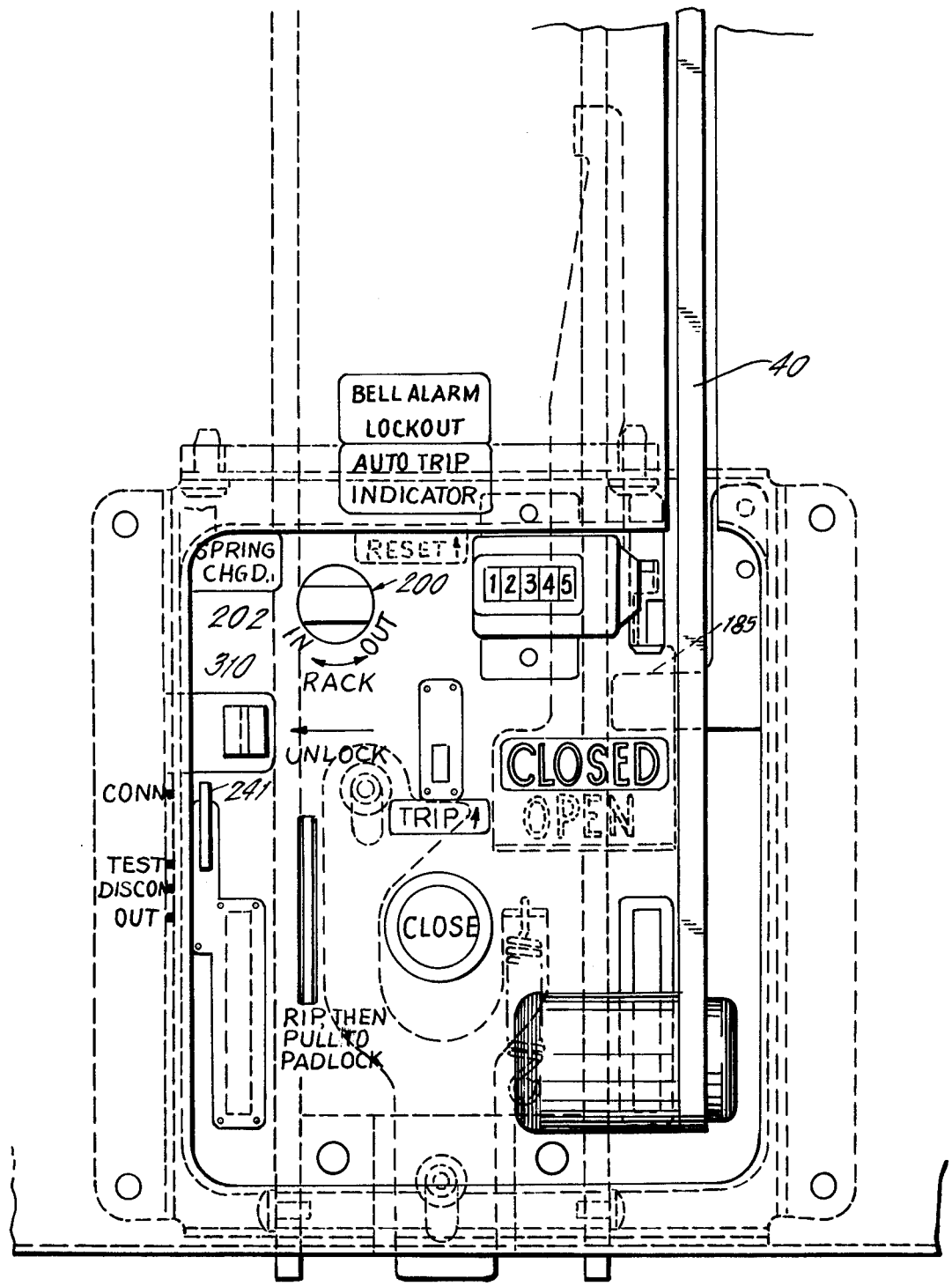

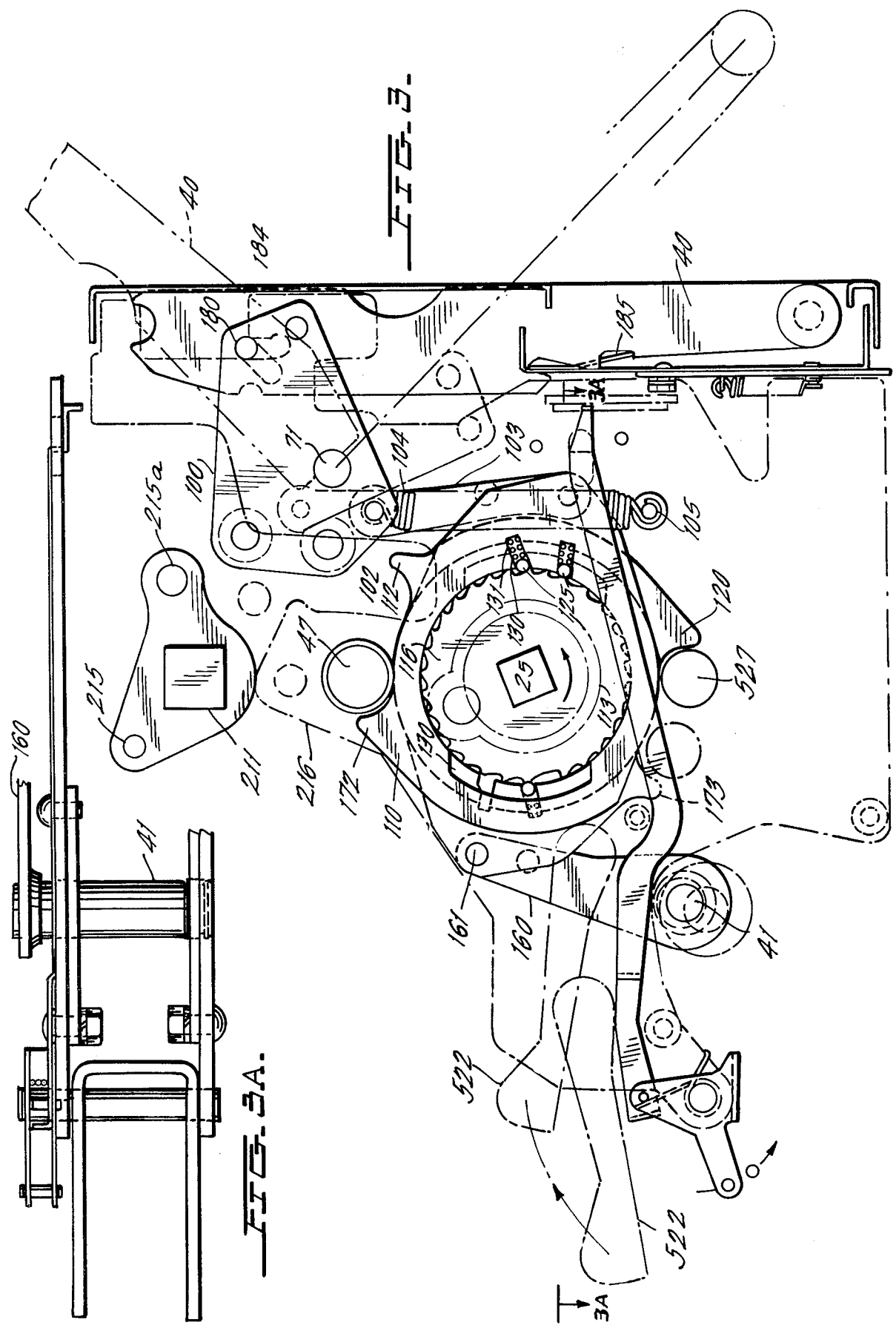

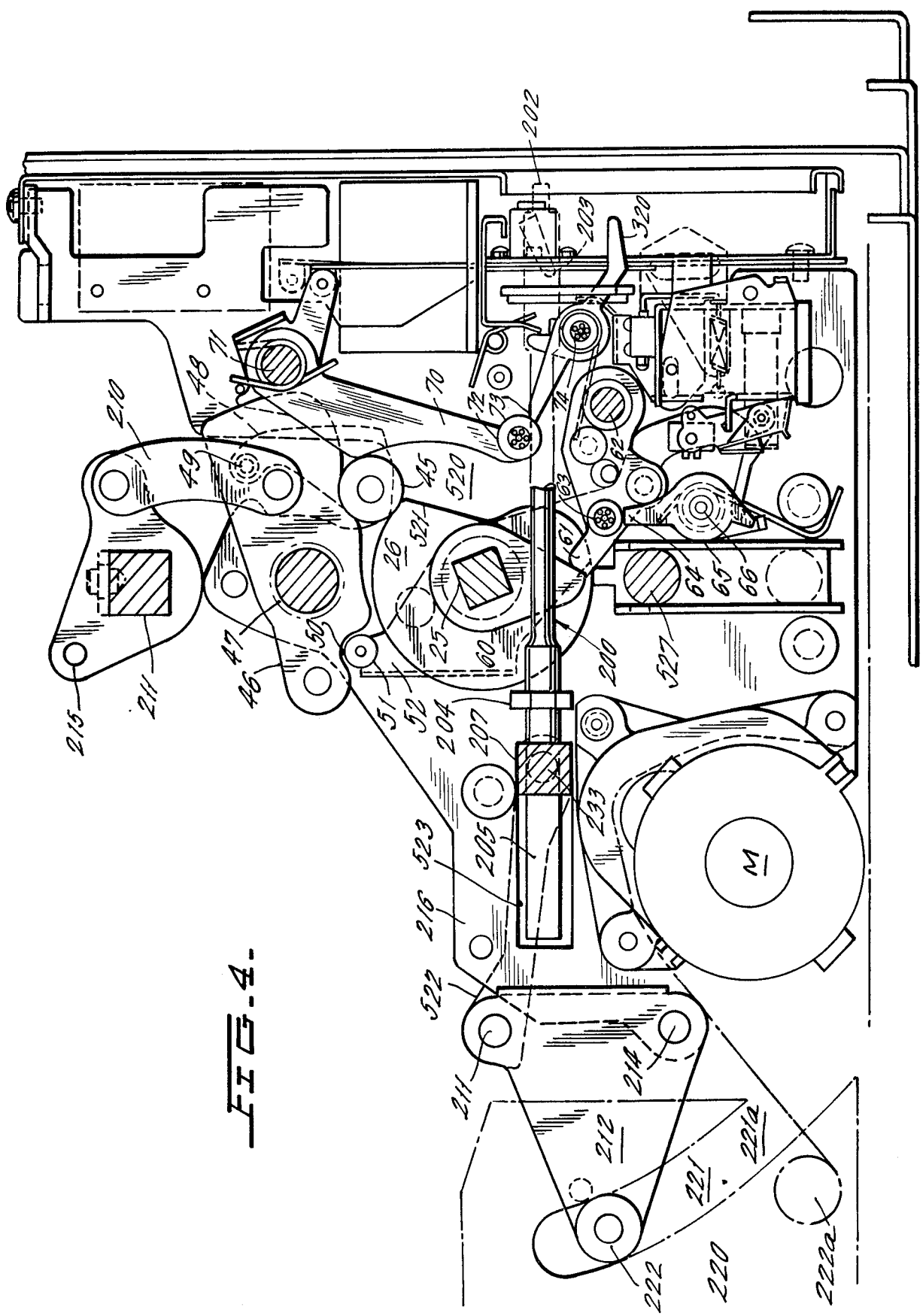

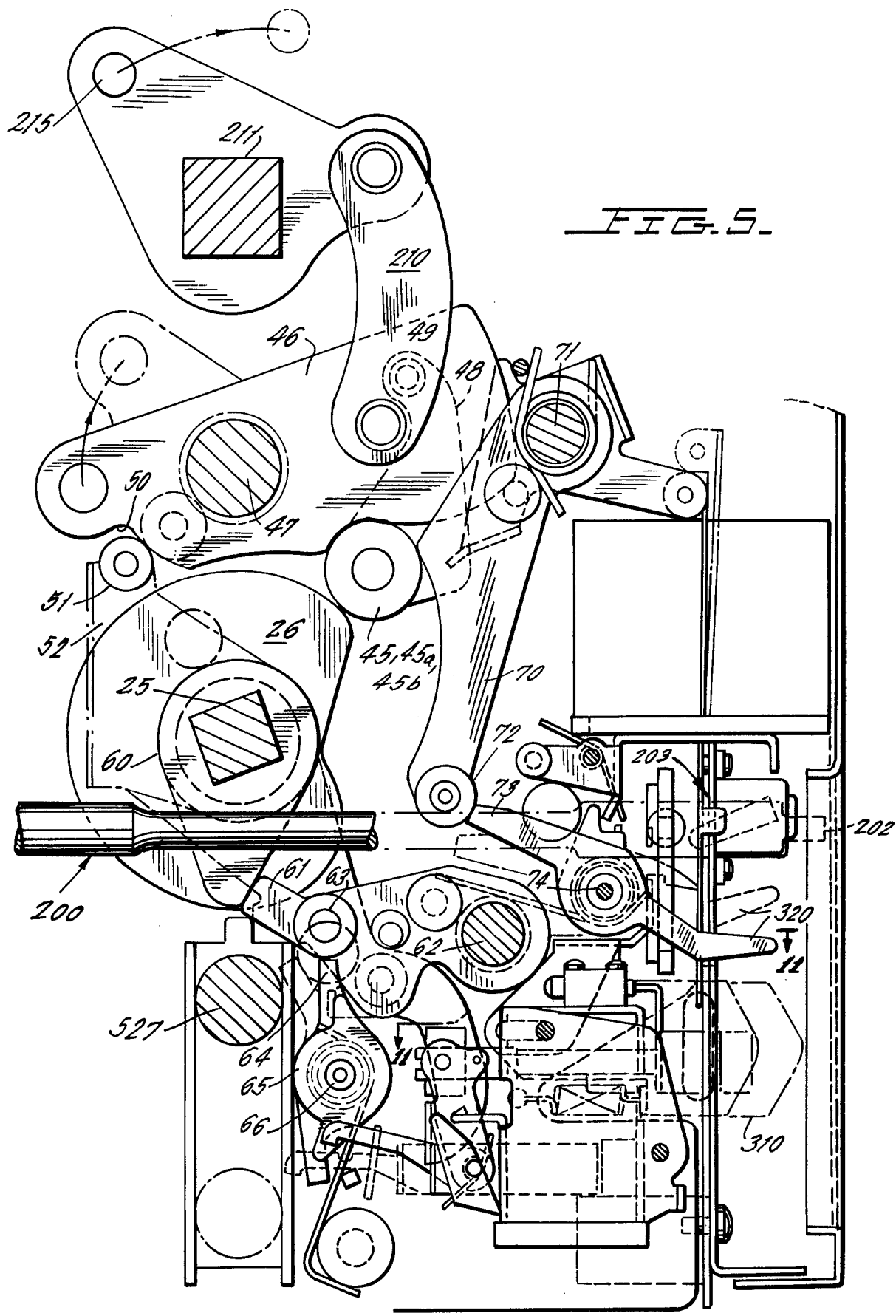

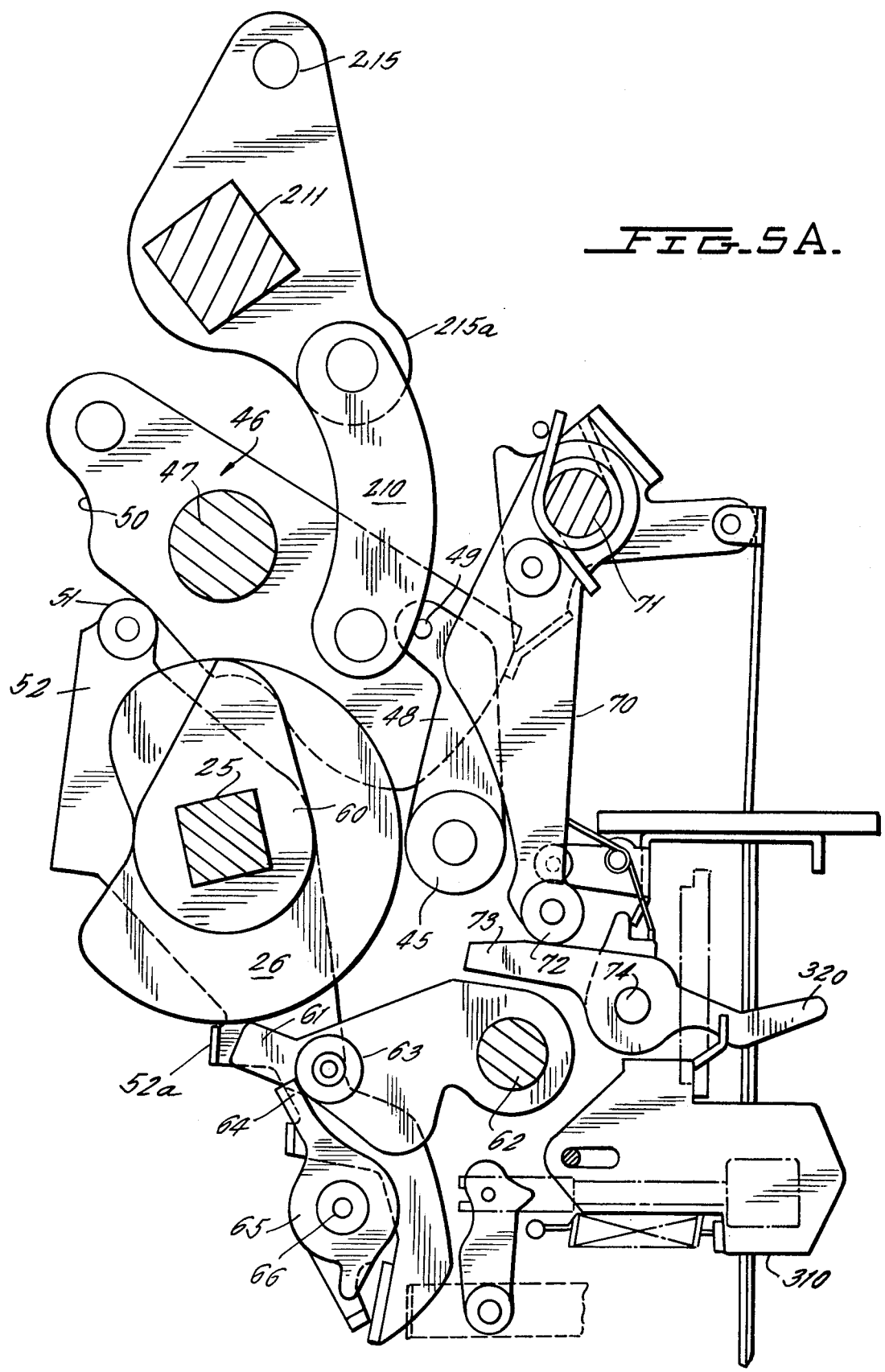

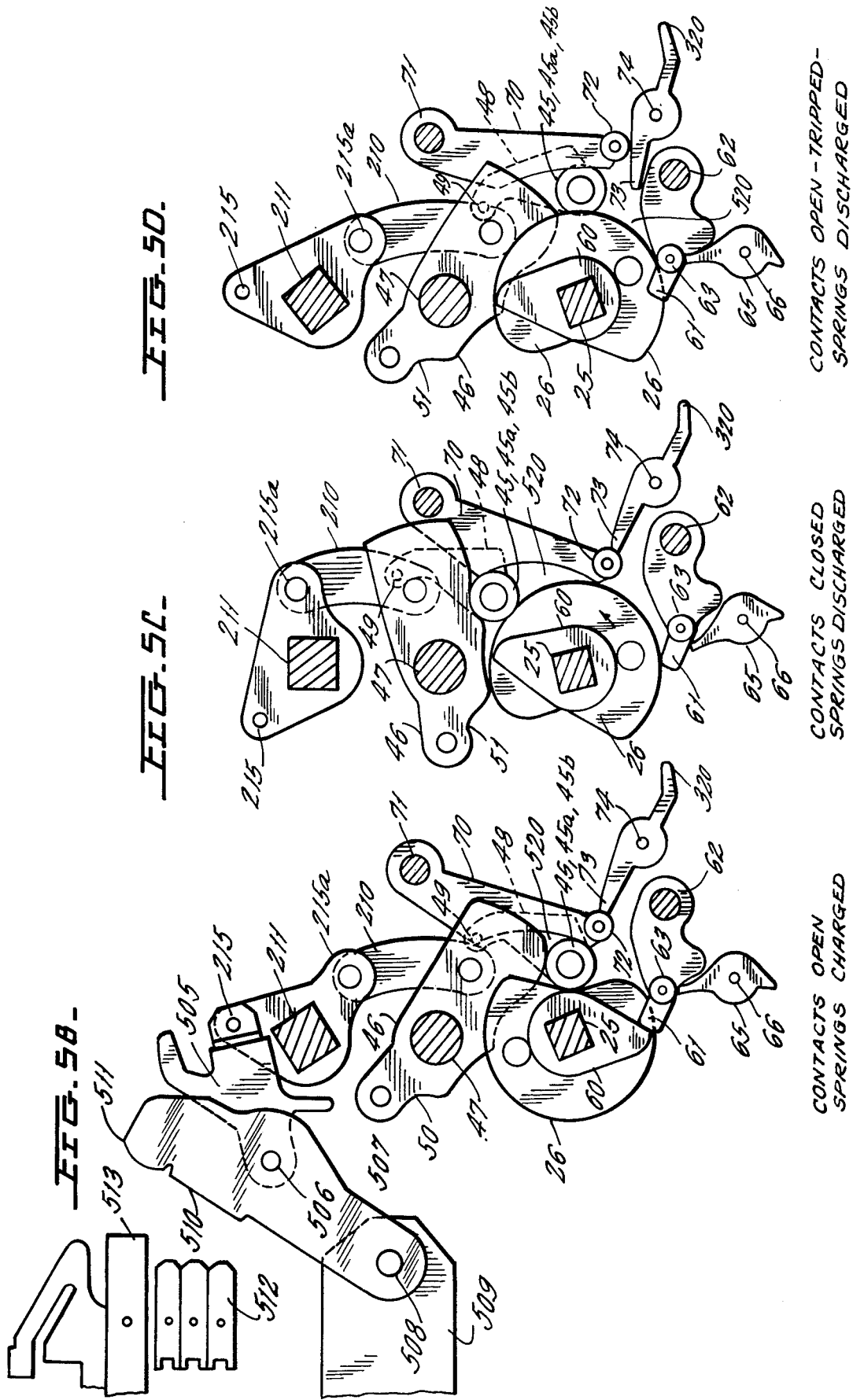

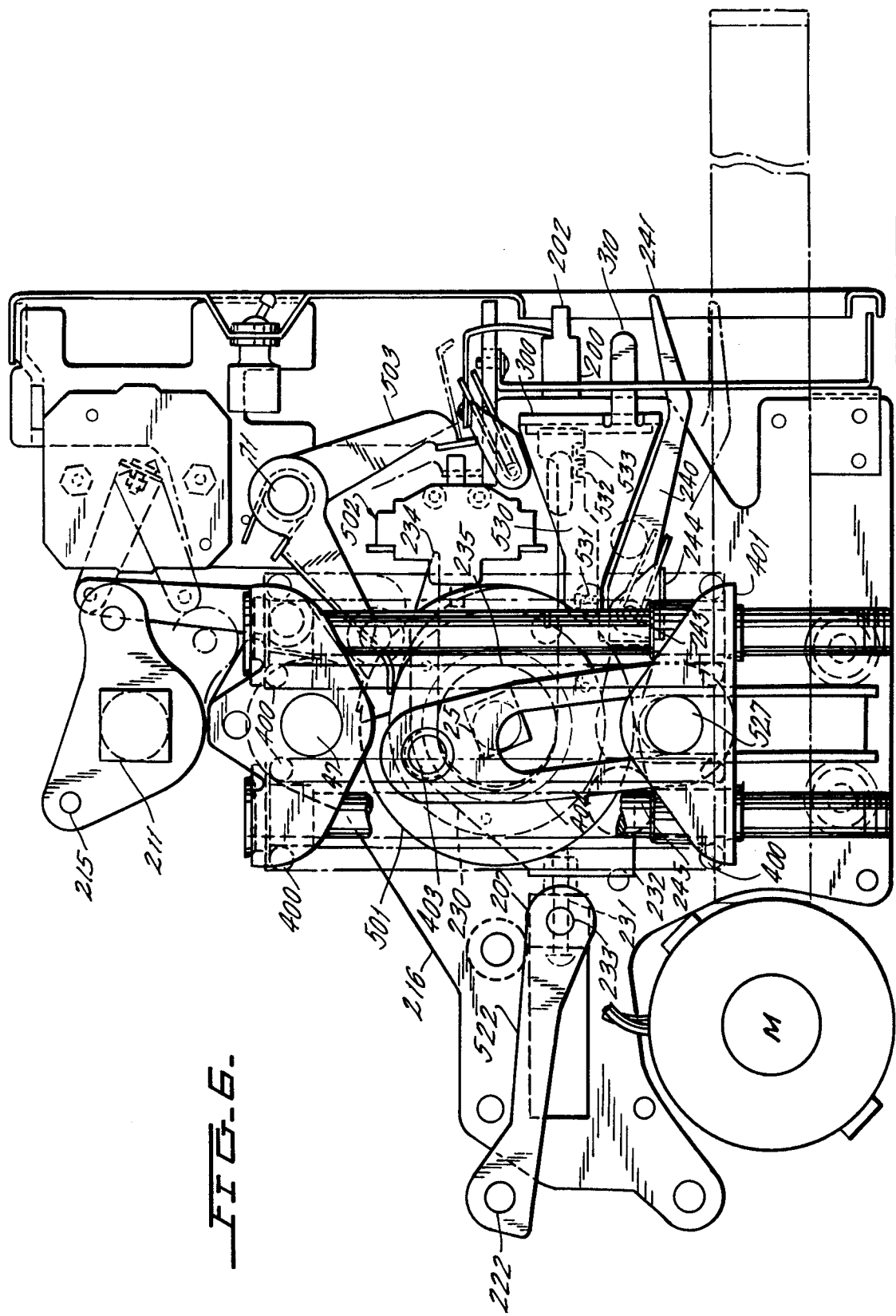

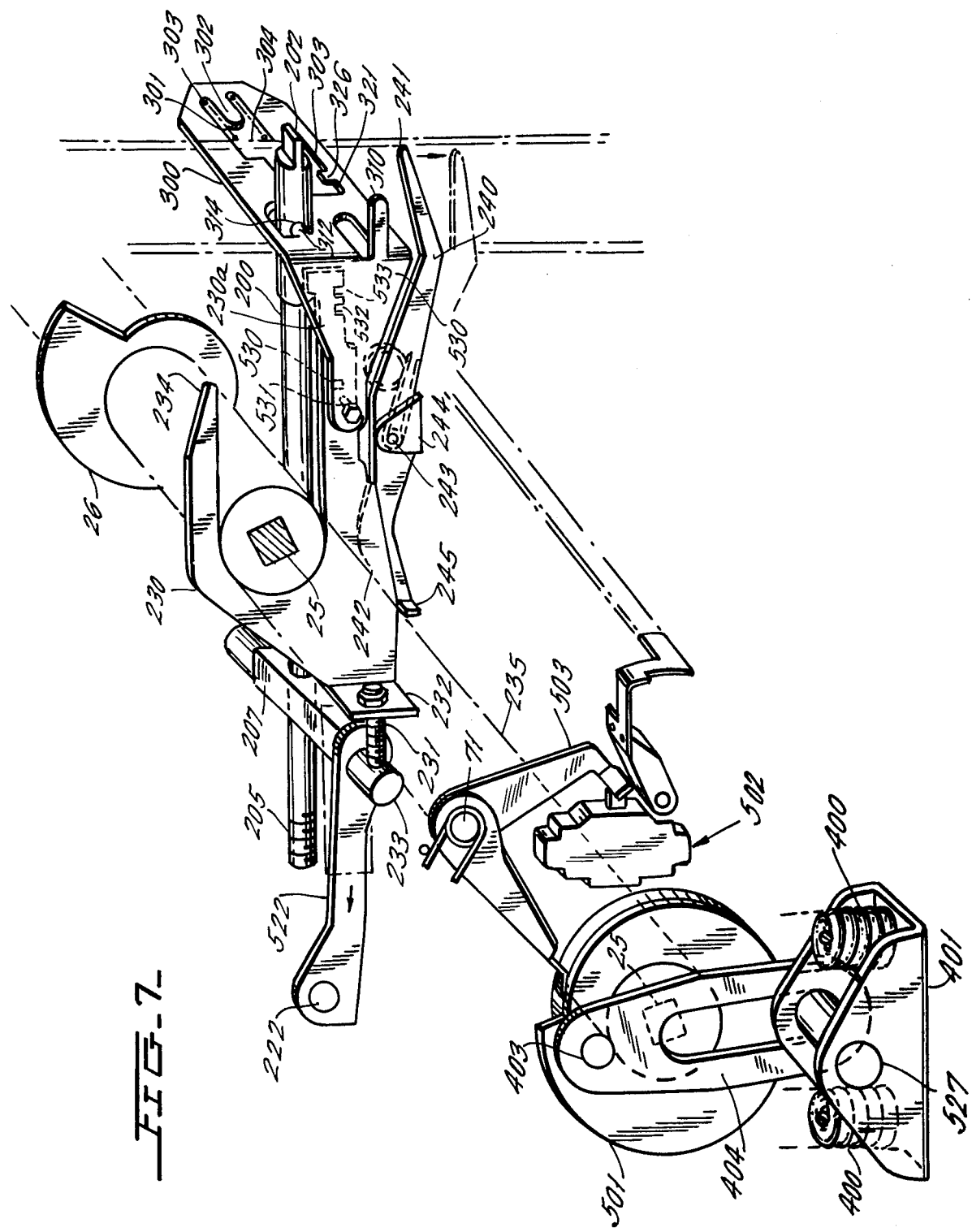

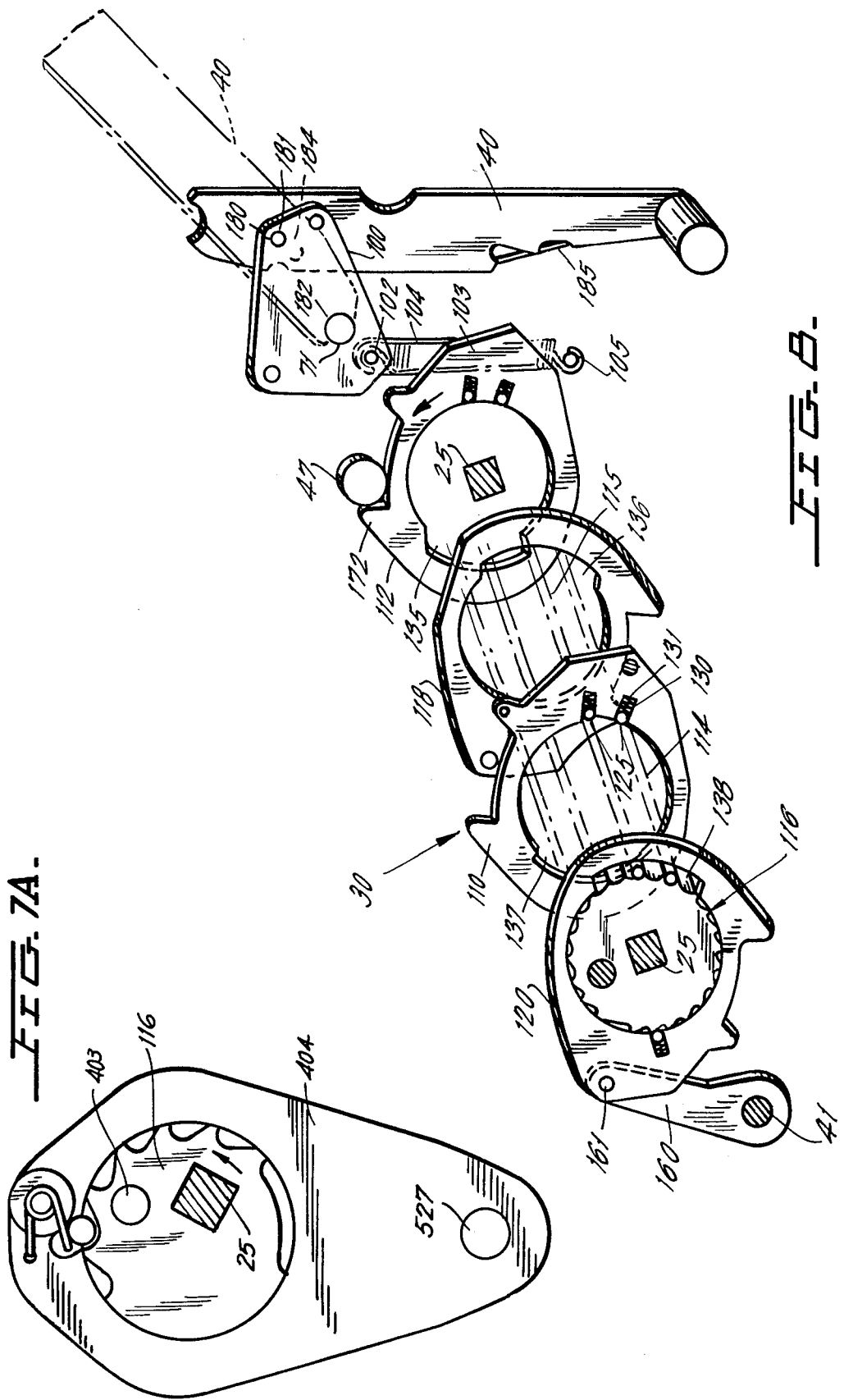

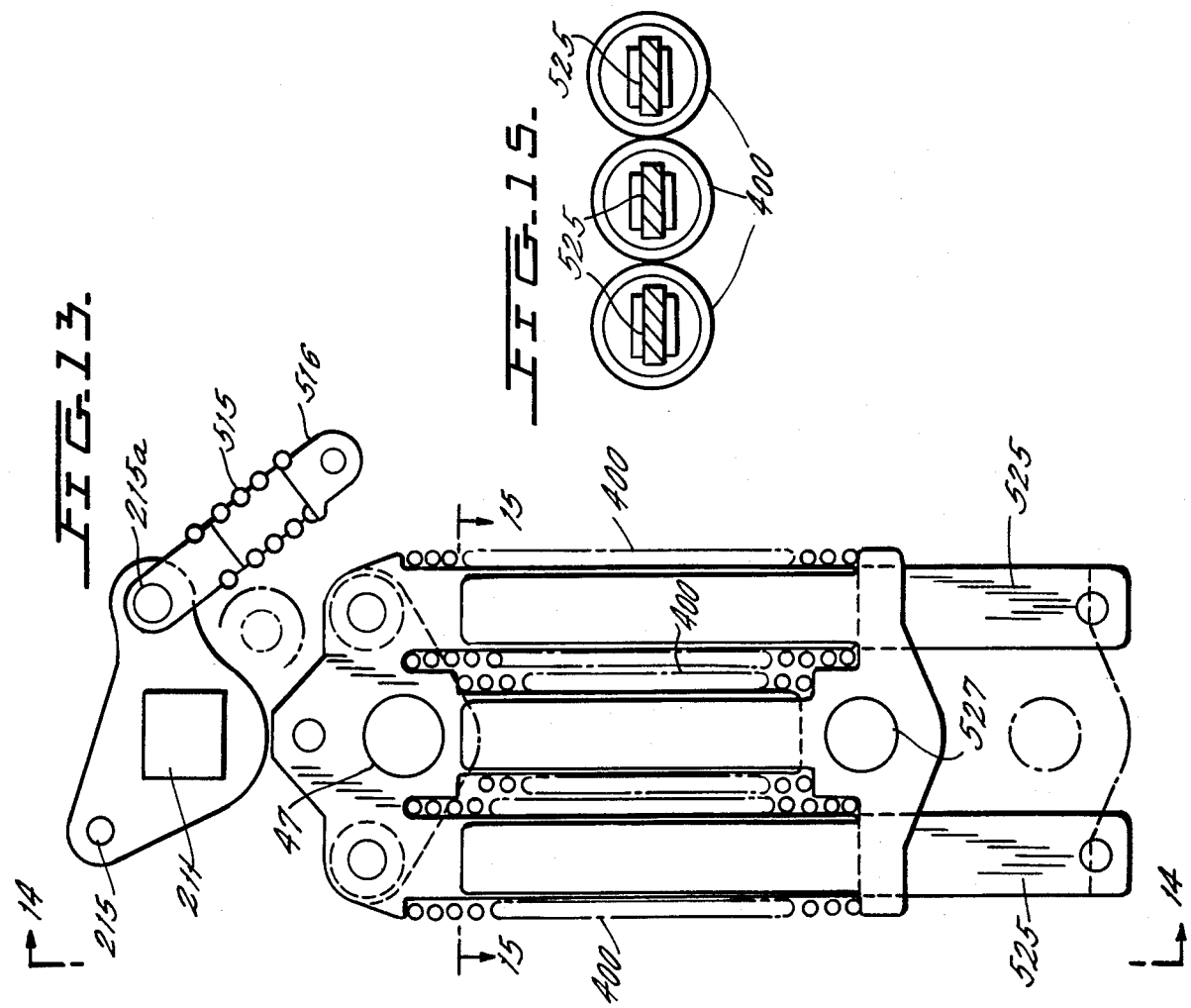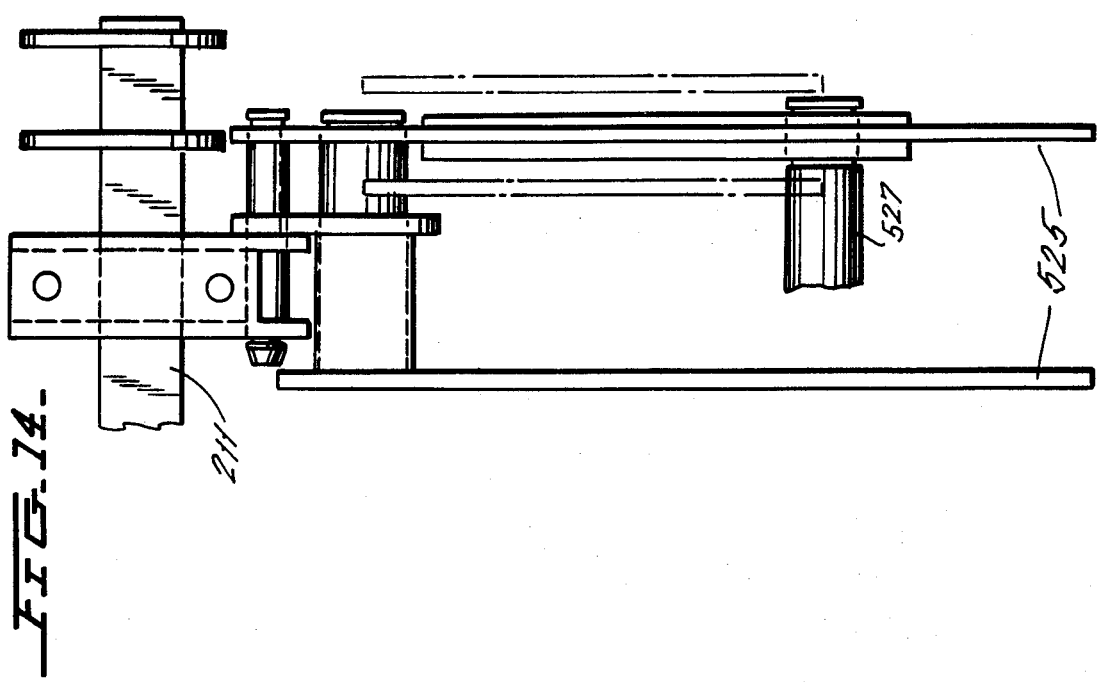

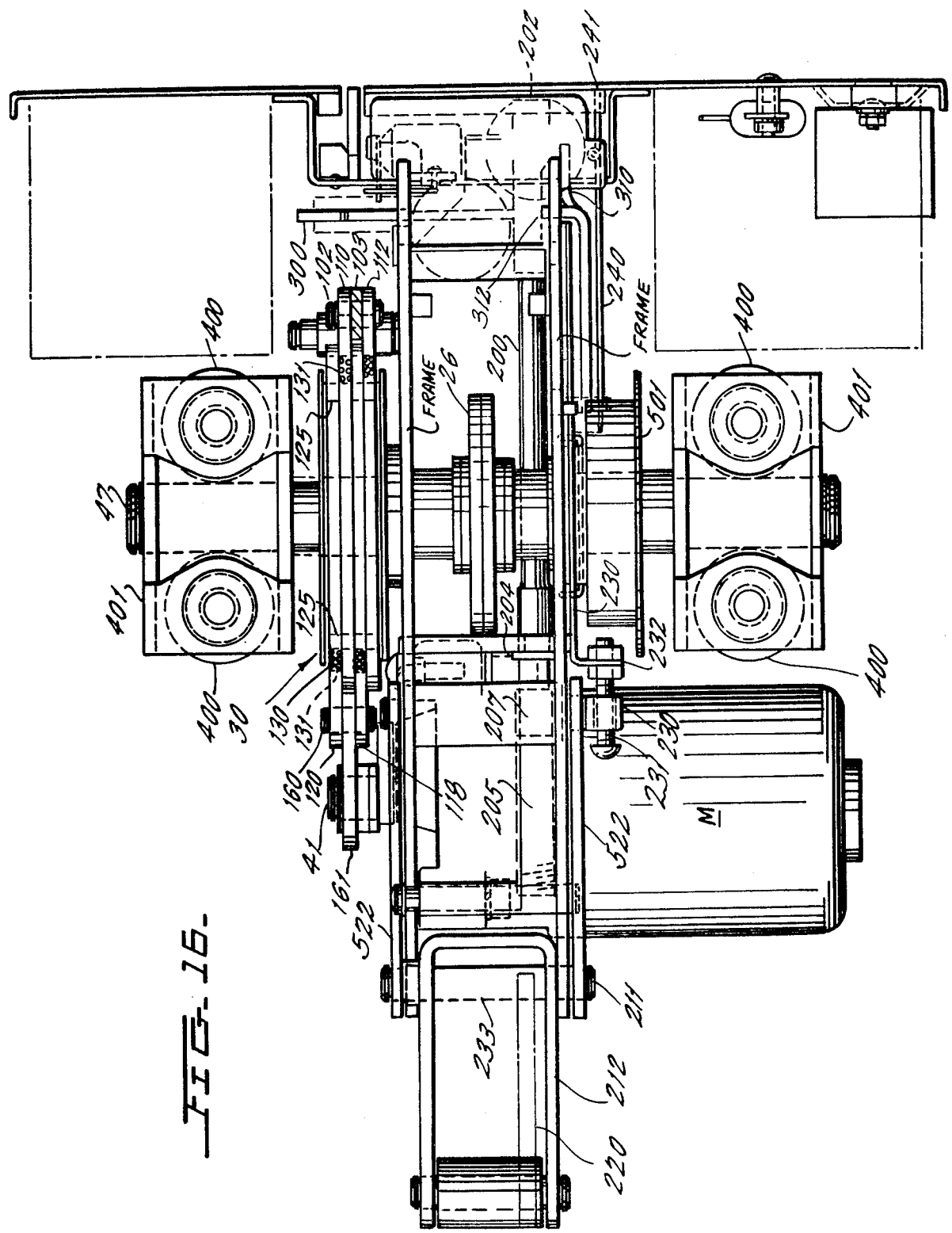

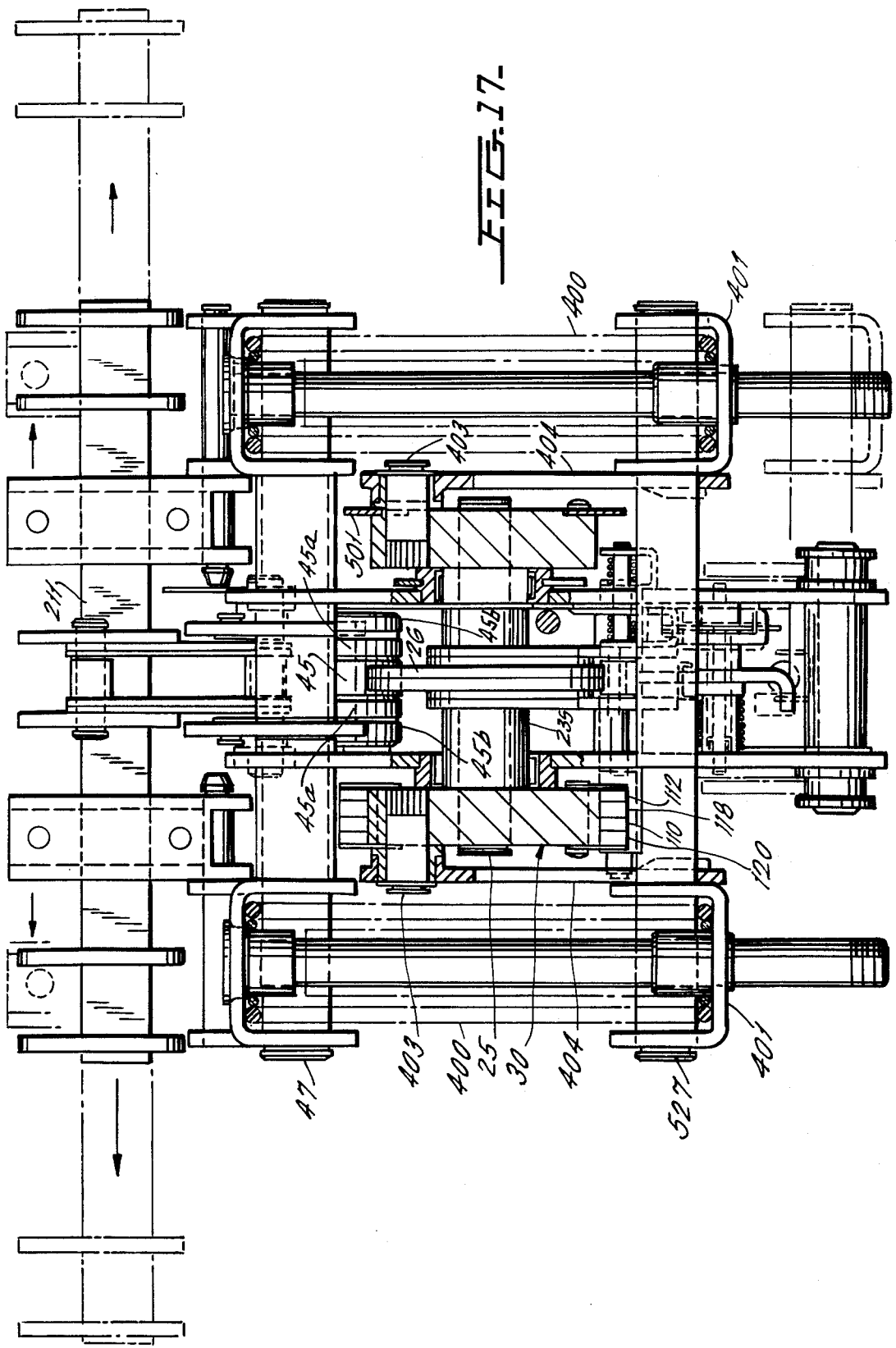

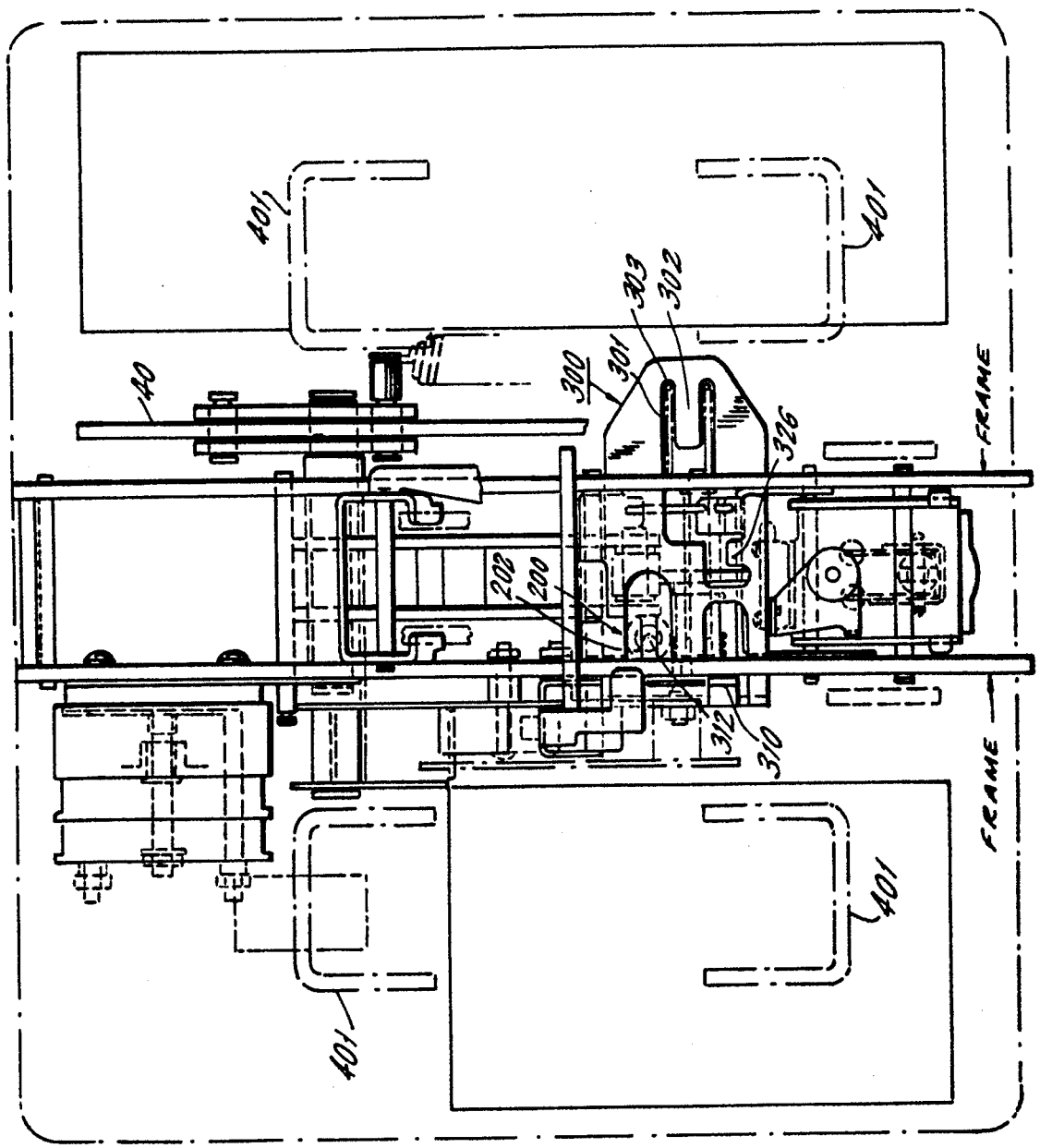

CIRCUIT BREAKER RACKING MECHANISM FOR DRAWOUT TYPE SWITCHGEAR

This application is related to and filed simultaneously with applications Ser. Nos. 735,017 and 735,040 both filed Oct. 22, 1976.

The present invention relates to racking mechanism for a circuit breaker of minimum size for any given application and of maximum simplicity for ease in manufacture and in operation. Included in the circuit breaker is a spring charging system for the spring closing operation and the racking mechanism for facilitating the insertion and removal of the circuit breaker in a switchboard housing or other cubicle.

BACKGROUND OF THE INVENTION

The circuit breaker utilizes a cam operated closing system wherein the primary closing cam acts also as the prop latch. This system differs from prior systems in that the cam follower path is determined by three cam surfaces as hereinafter described between which the closing forces are transmitted through free floating rollers.

This obviates the need for toggle links for the transmission of closing and supporting forces or the guiding of the cam follower rollers. The advantage of this arrangement is described in the applications above referred to.

SUMMARY OF THE INVENTION

The racking mechanism for the structure is included within the circuit breaker itself except for the cam connection with the cubicle that will cause the circuit breaker to be pulled in or racked out. The racking mechanism is so arranged that it is integrated with and occupies virtually the same space as the spring closing mechanism, utilizing certain of the same structures in such an arrangement that in effect the charging system for the springs and the racking mechanism for the breaker may in effect be said to be folded in upon each other thereby occupying a minimum of space for the particular application.

Thus, the utilization of the same or adjacent parts and the utilization of rollers which may intersect the two mechanisms, as hereinafter described, provide for a simplified structure of minimum size for the particular application and one which is more readily adaptable or tailored to any particular type of application. The use of worm gears, keyed or pinned racking arms and variable length large diameter racking shafts are avoided.

The racking mechanism is intended to be self-locking in any position and the output force is variable to match the sudden increase in resistance as the primary disconnect contacts engage. It is also desirable to prevent engagement of the disconnect contacts as the breaker is entered into the compartments unless the racking mechanism is in the fully withdrawn position and it is also necessary for the racking mechanism to be positively interlocked with the closing mechanism so that the breaker cannot be racked unless it is open and so that the breaker cannot be closed between racking positions.

It is a primary object of the present invention, by combining and integrating mechanism and by positioning and utilizing mechanisms for multipurpose operations, to provide a simplified spring closed circuit breaker wherein the spring charging system and the racking mechanism for the breaker may occupy substantially the same sections of the circuit breaker mechanism having some parts in common and utilizing parts which are essentially aligned with each other in such manner that either of the two systems occupies substantially no more space than any one of the systems by itself.

It is a further object of the present invention to utilize, in the racking mechanism and spring charging mechanism in a circuit breaker, a cam mechanism which will provide for precise control and selection between the spring charging function and the racking function and result in the interlocking of the operations so that complete control is achieved of all of the functions.

It is a further object of the present invention to provide a stationary cubicle racking cam to cooperate with the racking mechanism of the circuit breaker.

BRIEF DESCRIPTION OF DRAWINGS

The foregoing and many other objects of the present invention will become apparent in the following description and drawings in which:

FIG. 2 is an enlarged view of a portion of FIG. 1 showing the operating arrangements which will hereinafter be described.

FIG. 3 is a cross-sectional view of the mechanism taken from line 3—3 of FIG. 1 looking in the direction of the arrows.

FIG. 3A is a top view of a portion of FIG. 3 taken from line 3A—3A of FIG. 3 looking in the direction of the arrows.

FIG. 4 is a cross-sectional view showing the side of the mechanism from front to back taken from line 4—4 of FIG. 1 looking in the direction of the arrows showing the position of the elements with the contacts closed and springs charged.

FIG. 5 is a view corresponding to that of FIG. 4 but showing additional details and variable positionings for the mechanism of FIG. 4 and also showing the contacts and the trip latch in latched position.

FIG. 5A is a schematic view including those elements of FIG. 5 which are essential to a full understanding of the structure and showing the position of the elements with the contacts open the trip latch unlatched and the springs discharged.

FIG. 5B is a view corresponding to FIG. 5A showing the position of the elements with the contacts open and springs charged.

FIG. 5C is a view corresponding to FIGS. 5A and 5B showing the position of the elements with the contacts closed and springs discharged.

FIG. 5D is a view corresponding to FIGS. 5A, 5B and 5C showing the position of the elements with the contacts open, springs discharged and the circuit breaker in tripped condition.

FIG. 6 is a cross-sectional view taken from line 6—6 of FIG. 1 looking in the direction of the arrows.

FIG. 7 is a schematic expanded view of portions of the structure of FIG. 6 arranged to show in greater detail some of the operating mechanism shown in FIG. 6.

FIG. 7A is a view of a modified form of the drive link mount for charging the closing springs.

FIG. 8 is an expanded view in perspective of the ratchet system for spring charging as shown at the center of FIG. 3.

FIG. 12 is a front view of the circuit breaker just inside the front cover of FIGS. 1 and 2.

FIG. 13 is a side view of the closing springs and their cooperating parts.

FIG. 14 is a rear view of the closing springs taken from line 14—14 of FIG. 13.

FIG. 15 is a sectional view of the closing springs taken from line 15—15 of FIG. 13 looking in the direction of the arrows.

FIG. 16 is a top view of the mechanism of FIGS. 3 to 15 inclusive.

FIG. 17 is a rear view of the circuit breaker operating mechanism taken from the opposite plane of the circuit breaker from that of FIG. 12. This Figure shows an alternate assembly of the closing springs from that of FIG. 14.

Figure 1:
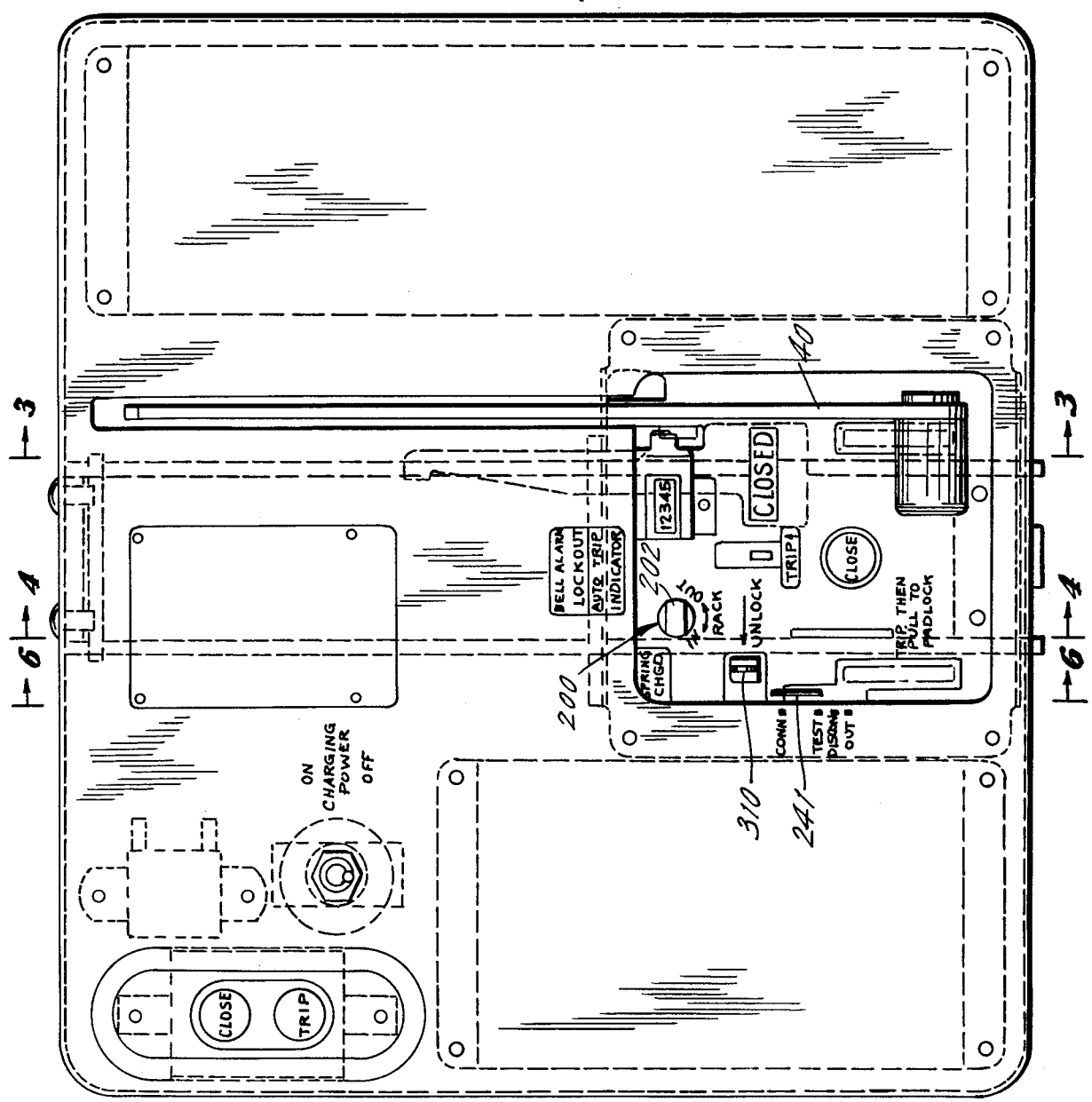
FIG. 1 is a front view of the novel circuit breaker mechanism and especially the front enclosure thereof and is shown as the first figure primarily because it indicates the various functions to be performed and provides reference planes for certain of the additional figures which are hereinafter set forth.
Figure 9:
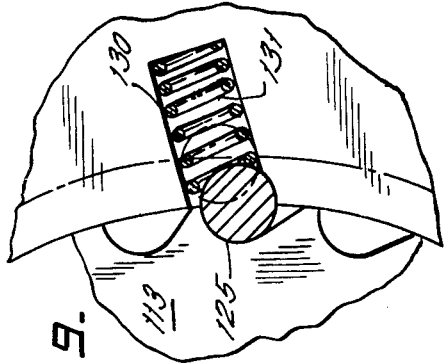
FIG. 9 is an enlarged diagrammatic view of a portion of the ratchet system elements shown in the expanded view of FIG. 8 and showing more particularly the manner in which a pawl is guided.
Figure 11:
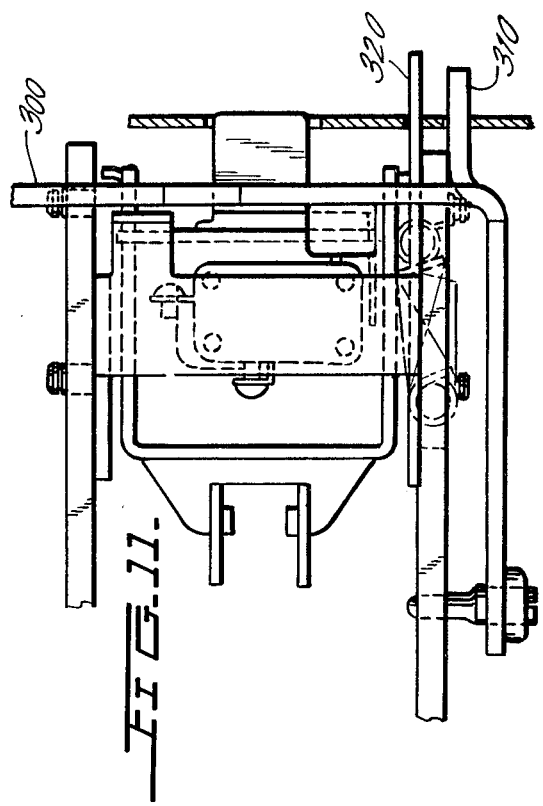
FIG. 11 is a view of the racking locking plate taken from line 11—11 of FIG. 5.

DESCRIPTION OF PREFERRED EMBODIMENT OF THE INVENTION BASIC CIRCUIT BREAKER STRUCTURE

Since the circuit breaker operating mechanism and the circuit breaker racking mechanism utilize many parts in common, an explanation of the operation of the racking mechanism requires an understanding of the operation of the circuit breaker.

Referring first to FIGS. 3, 4, 5, 5A, 16 and 17 there will first be described the mechanism for charging the closing springs and preparing the circuit breaker for operation; FIG. 5A, which is schematic, is the basic figure to follow, although important elements appear in FIGS. 3, 4, 5 and 17. The principal operating shaft 25 carries the first operating cam 26. It also carries crank arm 30 (see particularly FIGS. 16 and 17) which crank arm has within it a plurality of ratchet mechanisms shown in the expanded view FIG. 8, and indicated schematically in the side cross-sectional view of FIG. 3.

Essentially the operation counterclockwise of the crank arm 30 (which includes the pawl mechanism of FIGS. 3 and 8) will result in rotation of the shaft 25 and the charging of the closing springs preparatory to operation of the circuit breaker.

This operation results in moving the elements of FIG. 5A to the "CONTACTS OPEN, SPRING CHARGED" position of FIG. 5B. The crank arm 30 containing the pawl may be operated either by the manual handle 40 or by the motor driven crank 41 in the manner hereinafter described.

Figure 10:
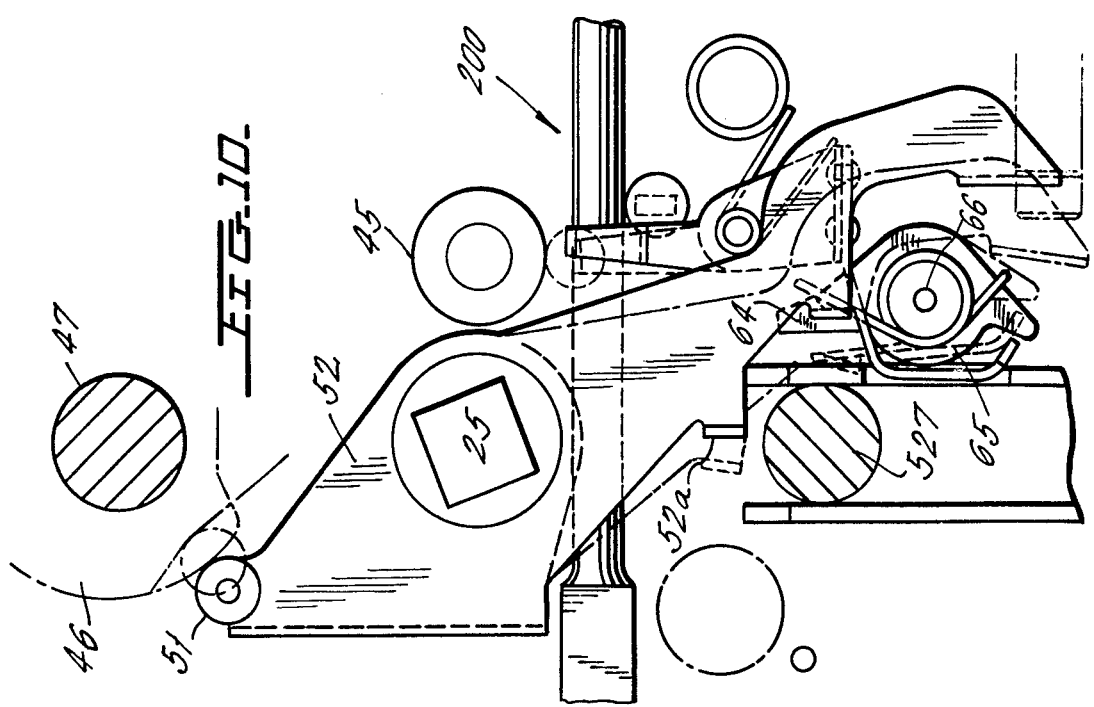
FIG. 10 is a schematic view of the operating interlocks of the device of FIGS. 1 through 9.

In the structure shown in the Figures above referred to, the shaft 25 is to be driven counterclockwise in the direction indicated by the arrow in FIG. 3 in order to charge the springs. For this purpose the handle 40 is so connected as to be operated in a clockwise direction to perform the operation while the crank arm 41 can be operated in either direction to perform this operation. On closing of the circuit breaker the lower end of lever 52a (FIG. 10) forcibly resets the closing latch and prop latch and disconnects the electrical and mechanical closing means. The breaker cannot accidentally be opened by operation of the closing springs upon recharge. The closing springs can be discharged only when the breaker is open.

The latch member 60 carried by the shaft 25 is driven on to the prop latch 61 which is pivotally mounted on the stationary pivot 62 and is provided with a latch roller 63 which is supported by the closing latch 64. The closing latch 64 is an extension of the bell crank lever 65 which is pivoted on the stationary pivot 66.

The shaft 25 may be rotated in a counterclockwise direction to charge the springs as previously pointed out by the handle 40 and by the motor crank arm 41. The handle 40 is inserted into the bell crank lever 100. It may operate the bell crank lever 100 in a clockwise direction around the pivot 71 of the said bell crank lever. When the bell crank lever is thus operated in a clockwise direction the pin 102 on the bell crank lever is raised thereby raising the link 103 which is connected thereto. A tension spring 104 connected between the pin 102 and a stationary pin 105 is so arranged that it provides a torque to reset bell crank lever 100 each time it is rotated by handle 40.

The link 103 as seen in FIG. 8 is arranged to operate the ratchet plates 110, 112 in the counterclockwise direction when the bell crank lever 100 is lowered. The shaft 25 carries a combination ratchet wheel crankarm 30. The ratchet wheel 30 is arranged so that it may cooperate with pawl elements carried by the members 110, 112 for the handle and 118, 120 for the motor. The pawls consist of a plurality of longitudinal rods 125 extending from pawl disc 120 through pawl disc 112. The pawls are backed up by compression springs 130 in the radial recesses 131 which thereby drive the pawls 125 into engagement with the ratchet teeth 116. The pawl carriers 110, 112, 118, 120 have clearances 135, 136, 137, 138 through which the pawls pass. Thus, the pawls engaged with carriers 110 and 112 (on the right side of FIG. 8) pass through the clearances 136 of pawl carrier 118 and 138 of pawl carrier 120 while the pawls for the pawl carrier 118 and 120 (on the left side of FIG. 8) pass through the clearances 135 and 137 of the pawl carriers 110 and 112. Consequently one set of pawls may operate the shaft 25 in response to handle operation or act as holding pawls while the other set of pawls may operate the shaft 25 in response to the operation of motor crank 41 or act as holding pawls.

In FIG. 8, the pawl carrier plates or ratchet plates are shown with the motor charge plates next to the mechanical housing and the manual charge plates (also the holding pawl plates) outboard. The mechanism may actually be built in reverse and has been so built and operated successfully. But the mechanism will work in either construction.

The pawl carriers (see FIGS. 3, 4, 5, 6, 13 and 17) 110 and 112 cooperate with the stop 47 and the pawl carriers 118 and 120 are positioned by the motor crank 41 so that when the tail 172 on the pawl carriers 110 and 112 engages the stop 47 the rotation of the shaft 25 in a clockwise direction is halted.

It will be noted that the handle 40 is engaged with the lever 100 first by the pin 180 through the side of the handle 40 which engages in a hole 181 in each of the sides of the lever 100. When the handle is pulled out to the dotted position shown in FIG. 8 or the similar dotted line position of FIG. 3 and then pressed down slightly, the notched end 182 of the handle engages pin 71 of the lever 100 thereby integrating the handle 40 with the lever 100. When the position of the handle with respect to the lever 100 is shifted slightly so that the handle is pulled out to the bottom end 184 of the slot 181 then the handle may be rotated independently of the lever 100 to a position where it will hang down in the solid line position of FIG. 8. At that point the handle may be releasably locked by the metallic flange 185 (see FIG. 2) at the front of the housing hereinafter referred to. At the completion of the motor spring charging operation the timing cam 501 (FIG. 7) operates a switch 502 through link 503 on pivot pin 71 to cut the motor off.

One of the results achieved by the pawl and ratchet mechanism (FIG. 8) is that the handle 100 may be used to rotate the crank arm 30 and the motor drive crank 41 may also be used each without interfering with the other.

Upon discharge of the closing springs (see FIG. 5B), the shaft 25 is rotated and the first cam 26 operates through the roller 45 and rollers 45a, 45b to rotate the third closing cam 46 in a counterclockwise direction around its pivot 47. The rollers 45, 45a and 45b are supported on the arm 48 which is supported on the pivot 49 which is a part of cam 46. The end of the third closing cam 46 opposite to that which is engaged by the roller 45b is provided with a recess 50 which engages the roller 51 (see also FIG. 10) on the lever 52 which is pivoted on the shaft 25.

The second closing cam 70 is stationarily pivoted on the pivot 71 and is provided with the latch roller 72 which bears against the tripping latch 73, rotatably mounted on the pivot 74 and spring biased toward the position shown in FIG. 4. Thus as the springs are charged shaft 25 is rotated counterclockwise until member 60 is blocked by the prop latch 61, the prop latch 61 being in turn supported by the engagement of latch roller 63 with the closing latch 64. This occurs when the closing springs are fully charged (see FIG. 5B).

The link 210 is connected to extension 215a of contact jack shaft 211. The opposite extension 215 on contact jack shaft 211 is connected to push rod 505 (see FIG. 5B) which in turn is connected by pin 506 to moving contact arm 507. Contact arm 507 is pivotally mounted at 508 on the extension 509 of the lower back connection stud and is provided with the moving main contact 510 and arcing contact 511 which in turn are operated, on rotation of contact arm 507 in a counterclockwise direction, to engage stationary main contact 512 (FIG. 5B) and stationary arcing contact 513.

Where a three pole circuit breaker is used, the operating mechanism is connected to the center pole. The extension 215a of the two outside poles are connected to opening tension springs 515 which, at their opposite ends, are connected to a stationary point 516 on the frame to provide the necessary opening bias for the contact arm 507 when the trip latch is operated.

FIGS. 5B, 5C and 5D show, respectively, the position of the parts for - contacts open, springs charged - contacts closed, springs discharged - contacts open, tripped or trip free, springs discharged.

FIG. 4 illustrates a salient aspect of the circuit breaker structure:

A cam slot 520 of variable curvature is, in effect, formed between link 70 and the side 521 of cam 26. As the spring is charged with the contacts open (FIG. 5B) the roller 45 can move to the bottom of cam slot 520. When the contacts are closed and the spring is discharged, the roller 45 is at the top of cam slot 520 (FIG. 5C). When the circuit breaker is tripped (FIG. 5D) the link 70 moves off its support latch 73 and the cam slot 520 is widened so that roller 45 is free of any support or guidance while, nevertheless, the springs are discharged.

THE RACKING MECHANISM

The basic operation of the racking mechanism may be seen in FIGS. 4, 5, 6 and 7. The racking mechanism is for virtually all purposes self-contained within the circuit breaker structure and housing providing a means for cooperating with a cammed surface in the cubicle in order to rack the circuit breaker in and out of the cubicle.

The racking mechanism comprises the racking lead screw 200 which, again, may more readily be seen in FIGS. 4, 5, 6 and 7. The racking lead screw is provided at its front end with a recess 202 to which the end of a racking crank may be connected in order to rotate the lead screw 200. The lead screw 200 is mounted for rotation in appropriate bearings 203, 204 in the housing of the circuit breaker in order to support the same so that it may rotate without moving. The racking lead screw 200 is also provided with the threaded end 205 at the inner section of the circuit breaker, the threaded end 205 being arranged so that it will cooperate with the travelling nut 207. It will thus be seen that rotation by the handle (not shown) of the end 202 of the racking lead screw 200 will cause the travelling nut 207 to move either toward the front of the breaker or toward the rear of the breaker in accordance with the direction of rotation of the racking lead screw 200. The travelling nut 207 is constrained from turning by its engagement in slots 523 (FIG. 4) of the mechanism housing. The nut 207 is connected by the link 522 (FIG. 4) to the cam roller pin 211 on the bell crank lever 212. The bell crank lever 212 is pivoted on the stationary pivot 214 carried by the mechanism frame support member 216.

The circuit breaker structure is shown in FIGS. 4, 6 and 7, in the fully racked in position with the nut 207 having been moved by rotation of lead screw 200 fully toward the front of the circuit breaker. The cubicle or the compartment in which the circuit breaker is to be racked is provided with a cam frame 220 (see FIG. 4) having the cam slot 221 into which the roller 222 carried by the bell crank lever 212 may enter. When the lead screw 200 is rotated as shown in FIGS. 4 and 7 to raise the cam roller 222 to its highest position, the roller 222 which has entered the lower end 221a of the cam slot 221 will rise from the dotted line position 222a to the solid line position 222 thereby racking the circuit breaker into the compartment. In the reverse operation the rotation of the lead screw 200 in the opposite direction will move the nut 207 to the left on the threaded end 216 thereby rotating the bell crank lever 212 in the counterclockwise direction and moving the cam roller 222 down with respect to FIG. 4. The movement of this roller 222 in the cam slot 221 will now cause the circuit breaker to be pushed to the right and thereby push the circuit breaker out of the compartment. The nut 207 is connected in any suitable manner not only to the link 522 but also to the travelling member 230; in this case it is shown connected by a bolt 231 from a flange 232 of the travelling member 230 to the pivot pin 233 carried by the nut 207 which also carries the link 522. The extension 234 of the member 230 rides on the surface 235 of the shaft 25 and is thus supported thereby. It will be obvious that as the nut 207 is moved toward the rear of the breaker the member 230 will move toward the left with respect to FIG. 7 and additional clearance will be provided. At the same time as the nut 207 is moved toward the rear or the left side of the lead screw 200 the bell crank lever 212 is rotated counterclockwise and downwardly so that the roller 222 and the cam slot 221 begins to force the circuit breaker out of the cubicle. Thus, the nut 207 moving toward the rear of the breaker produces an operation which forces the breaker forwardly and out of the cubicle.

RACKING POSITION INDICATOR

The indicating lever 240, the tip 241 of which may be seen also in FIGS. 1 and 2, is operated by the sloping surface 242 of the support member 230. The indicator lever 240 is connected on a stationary pivot 243 in the circuit breaker and is driven by the spring 244 so that its end 245 rides on the cam or sloping surface 242 of the travelling member 230 and is driven thereagainst. The position shown in the structure of FIG. 7 is the fully connected position with the indicator tip 241 at the top of its travel. As the circuit breaker is racked out by rotation of the lead screw 200 in a direction to move the nut 207 toward the rear of the circuit breaker, the support member 230 also moves toward the rear and the sloping or cam surface 242 moves towards the rear permitting the indicator lever 240 to rotate under the influence of the spring 244 in a clockwise direction from the position of the tip 241 shown in FIG. 7 toward the dotted line lower position.

As the racking out of the circuit breaker continues, the indicator tip 241 will drop from the connected position shown in FIGS. 1 and 2 to the test position shown in FIGS. 1 and 2 then to the disconnect position there shown and finally to the out position which will be reached when, in the operation of the lead screw 200, the cam roller 222 on the bell crank lever 212 has left the entry 221a of the cam slot 221. At this point the circuit breaker may now be bodily pulled out of the cubicle having been fully racked out past even the disconnect position to the out position which is an indication that the circuit breaker now may be safely removed.

The operation of the cam roller and its cooperation with the cam plate 220 may also readily be seen from the top view of FIG. 16 which is, as previously pointed out, an overall top view of the circuit breaker.

RACKING INTERLOCKS

Various interlocks are required to ensure appropriate operation of the racking mechanism so that, for instance, the racking mechanism cannot be operated while the circuit breaker is closed and also so that it cannot be operated without performing an additional operation at the initiation of the operation of the racking mechanism to ensure that the racking out of the circuit breaker will at all times be under the full control of the operator.

For this purpose the racking locking plate 300 is provided at the front of the circuit breaker as shown particularly in FIG. 12 and as shown in the expanded view of FIG. 7. The racking locking plate 300 is slidably mounted in an appropriate support just behind the front escutcheon plate of FIGS. 1 and 2. The locking plate 300 is spring biased toward locking position (toward the right, FIG. 7) by the compression spring 301 which surrounds the tongue 302 of the locking plate 300 and is positioned thereby. The spring 301 bears at its bottom end against an interior surface 303 of the locking plate adjacent the spring guide tongue 302. The opposite end of the spring 301 bears against the stationary surface 304 of the frame of the circuit breaker thereby biasing the racking locking plate to the right with respect to FIGS. 1 through 7 and 12. The racking locking plate is provided with a handle extension 310 which projects through the escutcheon plate of FIGS. 1 and 2 and is available so that the locking plate 300 may be drawn to the left with respect to the FIGS. 1 to 7.

The locking extension 312 of the racking locking plate 300 is thus driven toward the right with respect to FIG. 7 and into the recess 314 of the lead screw 200 adjacent the handle connecting end 202. This therefore prevents accidental rotation of the lead screw 200 until and unless the extension 310 of the racking locking plate 300 is moved to the left with respect to FIGS. 1, 2, 7 and 12.

As previously pointed out this extension 310 is the unlocking extension which is visible and available to the user of the circuit breaker. When the plate 300 is moved to the left by pushing the extension 310 to the left then the locking extension 312 moves out the opening 314 of the lead screw 200 and the lead screw 200 is now free to be rotated.

However it is essential that in the operation of the racking mechanism and of the circuit breaker that the circuit breaker not be moved away from the back disconnect contacts (not shown) unless the circuit breaker is open. Since only the circuit breaker contacts are designed to interrupt current and the back disconnect contacts are not designed to interrupt current, the initiation of the operation of the racking mechanism cannot safely take place unless the circuit breaker contacts are open. Accordingly the manual trip lever 320 for the circuit breaker extends out through the opening 321 of the racking locking plate 300 and in the normal supporting or untripped position of the circuit breaker the manual trip lever 320 extends alongside the vertical extension 326 of the racking locking plate 300. Therefore with the manual trip lever in the untripped position the racking locking plate 300 cannot be moved to the left. Thus the first step of the racking out operation is the lifting of the manual trip lever 320 from the front of the circuit breaker. When this manual trip lever 320 is lifted, then the locking extension 310 may be pulled to the left and the locking plate 300 operated to release the lead screw 200.

It will be seen that on insertion of the circuit breaker into the cubicle unless the cam roller 222 is at the bottom end of its travel in registry with the end 221a of the cam slot 221, the entry of the circuit breaker into the cubicle will be blocked by the engagement of the roller 222 with the front edge of the cam plate 220. The only point at which the cam roller 222 will register with the opening 221a of the cam slot 221 is in the "out" position of the structure as indicated by the indicator tip 241 of the indicator lever 240. Therefore the circuit breaker cannot be racked in to the cubicle unless it is first initially entered into the cubicle with the structures in the "out" position of the circuit breaker.

The closing springs (see FIGS. 13 and 17) are charged by the operation of either the handle 40 or the motor pin 41 as hereinbefore described. The closing springs 400 (FIGS. 7, 13 and 17) are compression springs, supported at their bottom end by the closing spring carrier 401, which ride on guides 525 as indicated in FIGS. 13 and 15. Pin 527 (FIG. 7) extends through the mechanism and is guided in a vertical slot in the mechanism housing wall. The rotation of shaft 25 rotates the crank pin 403 which is connected to the link 404 and lifts the lower carrier 401 on the closing springs up to the charges position shown in FIG. 7. Where a motor operation is used then the cam arrangement previously described and shown in somewhat more detail in FIG. 7 controls the operation of the motor to rotate the shaft 25 to charge the closing springs; this operation is halted by the switch 502 which is engaged by the cam plate also hereinbefore described.

In FIG. 7A, there is shown a modified form of a portion of the spring charging mechanism of FIGS. 7 and 8. In this modification, the eccentric mounting of the ratchet wheel and pawl carrier, a portion of which is indicated by the reference numeral 116 on the operating shaft 25 provides a greater mechanical advantage at the point where the closing spring loads exert the greatest resistance to the charging effort.

FIGS. 4, 5, 5A, 5B, 5C, 5D, 6 and 7 show the operation and position of the parts for various conditions of the circuit breaker as noted thereon.

FIG. 5D illustrates that, when the contacts are closed or in process of being closed (trip free) with the springs discharged or in process of being discharged, the operation of trip latch 73 by handle 320 or any other means will trip the circuit breaker contacts open.

Referring to FIG. 7, it will be noted that the indicator moves from a connect to a disconnect to a test to an "out" position. The connect and disconnect positions can be predetermined by an inward extension 530 on the racking locking plate 300 shown in FIG. 7. A rectangular extension 531 of member 530 extends inward to an extending prong 230a of the support member 230. Prong 230a, with two notches 532, 533, successively engages rectangular extension 531 of member 530 and establishes the test and disconnect position of the circuit breaker in the cubicle. In each case, member 310 must be moved to the left to permit further movement of the breaker and finally must again be moved to the left to permit movement of the breaker to the out position. In each case, the spring 301, driving the locking plate 300 and its extension 530 to the right with respect to FIG. 7 snaps extension 531 into notch 532 and then 533, requiring an additional operation of finger 310 to release the racking mechanism for further movement.

In the foregoing the present invention has been described solely in connection with preferred illustrative embodiments thereof. Since many variations and modifications of the present invention will now be obvious to those skilled in the art it is preferred that the scope of this invention be defined not by the specific embodiments herein contained but only by the appended claims.

The embodiments of the invention in which an exclusive privilege or property is claimed are defined as follows:

1. In a circuit breaker for use in a cubicle;
   a racking mechanism for moving the circuit breaker to connected, test, disconnect and draw out position, said racking mechanism comprising:
   a lead screw mounted in the circuit breaker and extending from the front to the rear of said circuit breaker;
   said lead screw having a threaded section at the end thereof adjacent the rear of the circuit breaker;
   said lead screw having a driving section at the front of the circuit breaker and means for engaging said driving section to rotate said lead screw;
   means for mounting said lead screw in said circuit breaker and retaining the same axially stationary therein;
   said lead screw being angularly rotatable in said mounting;
   a travelling nut on the threaded section of said lead screw;
   guide means for the said travelling nut maintaining said travelling nut against rotation with said lead screw and causing said travelling nut to move longitudinally of said lead screw when said lead screw is rotated;
   a cam roller carrying bracket pivotally mounted in said circuit breaker;
   a link connecting said cam roller carrying bracket and said travelling nut;
   said cam roller carrying bracket rotating in one direction when said travelling nut moves in one direction and in an opposite direction when said travelling nut moves in an opposite direction;
   a cam roller mounted on said cam roller carrying bracket; said cam roller being moved by said cam roller carrying bracket in a vertical direction between a rack out position wherein the cam roller is in a position to permit withdrawal of the circuit breaker from said cubicle and insertion thereof into said cubicle and a fully racked in position wherein said circuit breaker is fully inserted into said cubicle;
   said cubicle having a back wall and a front;
   the back wall of said cubicle having a plurality of stationary disconnect contacts;
   the rear of said circuit breaker having corresponding circuit breaker disconnect contacts;
   and means in said cubicle cooperating with said cam roller; engagement of said cam roller with said corresponding means and movement of said roller with respect to said cooperating means causing said circuit breaker to move between the drawout position and the connected position.

2. The circuit breaker of claim 1 in which said cooperating means is at the rear of said cubicle and includes a cam track extending normal to said wall toward the front of the cubicle and having an entry directed toward said front of said cubicle;
   said cam roller engaging said cam track when the cam roller is in the drawout position of said cam roller;
   rotation of said lead screw causing said cam roller to move vertically toward the connected position; and the engagement of said roller with the said cam track moving the circuit breaker toward the connected position; rotation of said lead screw in an opposite direction causing said breaker to move toward the drawout position.

3. In the circuit breaker of claim 2, means for driving said lead screw in the desired direction to insert said circuit breaker in said cubicle and to draw the same out of said cubicle;
   a locking plate adjacent said driving section of said lead screw;
   said locking plate having a tang; said lead screw having a recess,
   means biasing said locking plate toward said lead screw and driving said tang into said recess, said lead screw being incapable of rotation with said tang in said recess.

4. The circuit breaker of claim 3 in which said locing plate is movable against said biasing means to release said lead screw for rotation;

trip means for said circuit breaker; said trip means blocking movement of said locking plate while said trip means is in any position other than the trip position.

5. The circuit breaker of claim 4 in which a first detent member is provided on said circuit breaker; said first detent member being connected to said travelling nut;

and a complementary detent member is provided on said locking plate;

said first detent member and said complementary detent member cooperating to establish a releasable stop position for said circuit breaker when being driven by said lead screw;

one of said first detent member and complementary detent member are repeated to form a plurality of successive detents establishing at least a disconnect and test position for said circuit breaker.

6. The circuit breaker of claim 4 having a front plate; said locking plate extending parallel to said front plate and being movable in a plane parallel to said front plate;

a first opening in said front plate; an extension of said locking plate extending through said first opening; a second opening in said front plate; a portion of said driving section of said lead screw being accessible through said second opening.

7. The circuit breaker of claim 6 having a third opening in said front plate;

a lever pivotally mounted in said circuit breaker; an end of said lever on one side of its pivot extending through said third opening;

an extension carried by said travelling nut; said extension having a cam surface engaging a portion of said lever on the other side of its pivot;

movement of the travelling nut causing movement of said first mentioned end of said lever in said third opening to indicate the location of the travelling nut and hence the position of the circuit breaker in said cubicle.

8. The circuit breaker of claim 7 in which said front plate is provided with a fourth opening;

said trip means including a trip lever extending through said fourth opening;

said trip lever locking said locking plate against movement in an unlocking direction;

said trip lever, when operated to trip the circuit breaker, releasing said locker plate for movement in an unlocking position;

said trip lever also being operable to releasably maintain the locking plate in an unlocked position during racking of the circuit breaker into and out of the cubicle.

* * * * *

UNITED STATES PATENT AND TRADEMARK OFFICE
CERTIFICATE OF CORRECTION

PATENT NO. : 4,101,744
DATED : July 18, 1978
INVENTOR(S) : George A. Wilson

It is certified that error appears in the above-identified patent and that said Letters Patent are hereby corrected as shown below:

In Column 3, line 45, after "arm" insert -- is a ratchet wheel and --

In Column 4, line 24, change "FIG." to -- FIGS. 3 and --

In Column 4, line 26, after "lowered." insert -- Link 103 is connected to plates 112 and 110 by pin 103a. --

In Column 4, line 28, after "wheel" insert -- crank arm --

In Column 4, line 35, after "teeth 116" insert -- mounted on shaft 25, as seen in Figures 3, 8 and 16 --

In Column 4, line 49, change "charge" to -- charging --

In Column 4, line 50, change "charge" to -- charging --

The drawings are to be read with following addenda:

In Figure 3 add a lead line between the reference numeral 102 and the pivot point for the link 103 at the upper end of the link 103 on the member 100. Add the reference numeral 103a to the lower pin of the link 103.

UNITED STATES PATENT AND TRADEMARK OFFICE
CERTIFICATE OF CORRECTION

PATENT NO. : 4,101,744
DATED : July 18, 1978
INVENTOR(S) : George A. Wilson

It is certified that error appears in the above—identified patent and that said Letters Patent are hereby corrected as shown below:

In Figure 8 insert the link 103 on the pivot 102 in dotted line form overlying the spring 104. Add the pivot point 103a at the lower end of the link 103. Add the reference numeral 103a to the hatched cross-sectional member of the lower right section of member 110 and add the reference numeral 161 to the circular element at the upper left section of element 110.

In Figure 16 add the reference numeral 116 to the members which collectively include 120-112.

Signed and Sealed this

Eighth Day of May 1979

[SEAL]

Attest:

RUTH C. MASON
Attesting Officer

DONALD W. BANNER
Commissioner of Patents and Trademarks